(No Model.) 2 Sheets—Sheet 1.

A. MAROTTE.
FLEXIBLE SHAFT.

No. 597,559. Patented Jan. 18, 1898.

WITNESSES:
William B Ashur
Geo. H. Jackel

INVENTOR
Alfred Marotte
BY
Socrer Pagan
ATTORNEYS.

THE NORRIS PETERS CO., PHOTO-LITHO., WASHINGTON, D. C.

(No Model.) 2 Sheets—Sheet 2.
A. MAROTTE.
FLEXIBLE SHAFT.
No. 597,559. Patented Jan. 18, 1898.
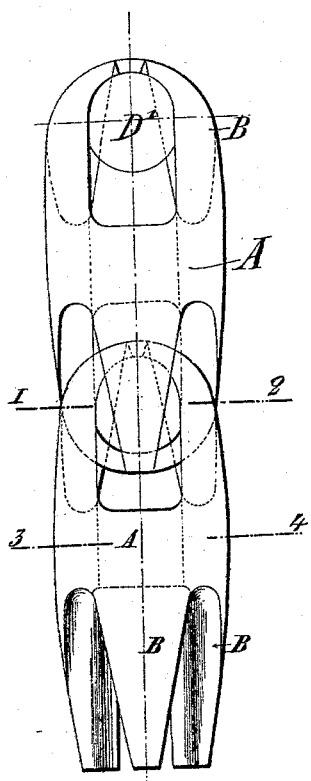
FIG.12
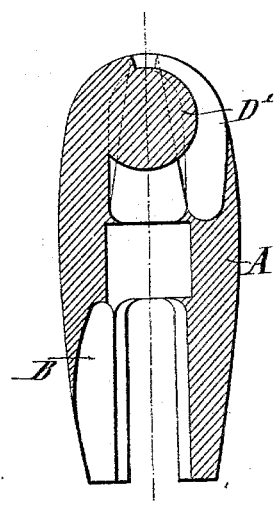
FIG.14.
FIG.15.
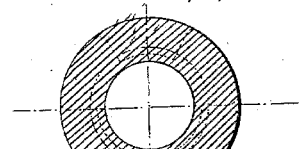
FIG.13.
FIG.16.
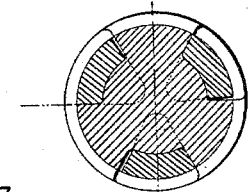
FIG.17.
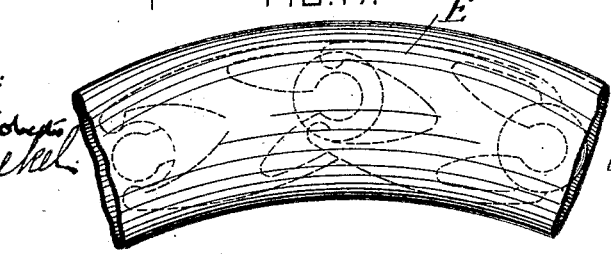
WITNESSES:
William B. Roberts
INVENTOR
Alfred Marotte
BY
ATTORNEYS.

UNITED STATES PATENT OFFICE.

ALFRED MAROTTE, OF PARIS, FRANCE, ASSIGNOR TO SÉNÉCHAL DE LA GRANGE, OF SAME PLACE.

FLEXIBLE SHAFT.

SPECIFICATION forming part of Letters Patent No. 597,559, dated January 18, 1898.

Application filed March 24, 1897. Serial No. 628,966. (No model.) Patented in France April 1, 1895, No. 246,270, and in England December 30, 1895, No. 24,951.

*To all whom it may concern:*

Be it known that I, ALFRED MAROTTE, a citizen of the Republic of France, residing at Paris, (Seine,) have invented certain new and useful Improvements in Flexible Shafts, (for which I have received Letters Patent in France April 1, 1895, No. 246,270, and in Great Britain December 30, 1895, No. 24,951,) of which the following is a specification.

This invention relates to certain improvements in flexible shafts by which motion can be transmitted to a certain limited distance or in direct line with great facility; and the invention consists of a flexible shaft composed of a number of removable links provided with fingers and a ball, the fingers adapted to be bent about the ball, forming interlocking ball-and-socket joints.

The invention also consists in details of construction, as will be fully described hereinafter and finally pointed out in the claims.

Figure 2:
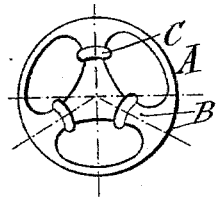
Figure 1:
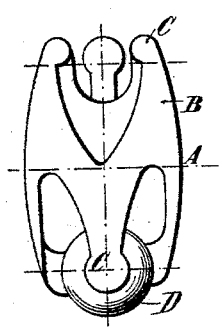
Figure 3:
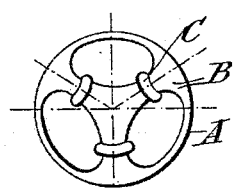
Figure 4:
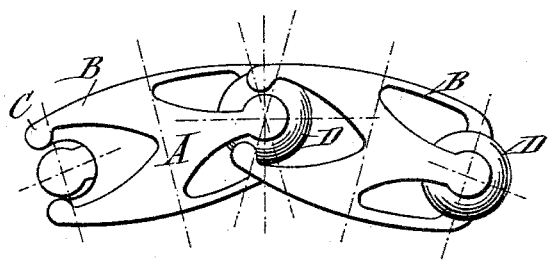
Figure 6:
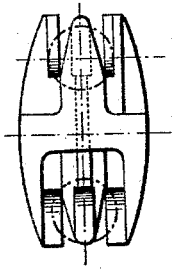
Figure 7:
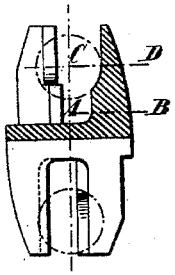

In the accompanying drawings, Figures 1, 2, and 3 represent, respectively, a side elevation and a top and bottom view of one link of my improved flexible shaft. Fig. 4 is a side view of two connecting-links. Figs. 5, 6, 7, 8, 9, 10 and 11 show modified constructions of my improved flexible shaft. Figs. 12, 13, 14, 15, 16, and 17 are details of another modified construction of my improved flexible shaft.

Similar letters of reference indicate corresponding parts.

Referring to the drawings, A represents the body of a single link of my improved flexible shaft, the end of which is constructed so as to form fingers B, which are adapted to be bent so as to surround a ball D. The fingers of the link are so arranged that the fingers in one end alternate with the fingers in the other end. The terminals C of the fingers may be made in any suitable shape.

Figure 10:
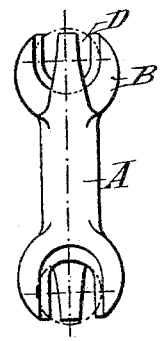
Figure 8:
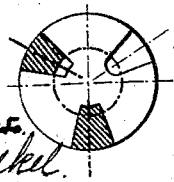
Figure 9:
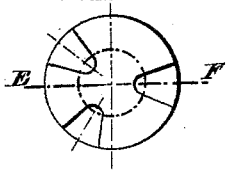
Figure 11:

In the annexed drawings, Figs. 1 to 5, a link is shown in which the terminals of the fingers are made of spherical shape, though they may be of any other suitable form. As shown in Fig. 4, two adjacent links are so connected with each other that the fingers at the end of one link extend in the space at the adjacent end of the other link in such a manner that all the adjacent fingers inclose a ball D, which, when clasped by said fingers, forms the connection between the ends of the links. When the ball D is placed in position, the ends of the links are slightly drawn inwardly about the ball, so as to form a cage, from which the ball cannot escape. When the links are thus connected with each other, they are inclosed in a flexible covering or envelop E, which, without impeding the movements of the links, permits them to transmit without delay the initial rotary movement applied to one of the extensions of the shaft, so as to overcome the resistance exerted on the other end of the same, as shown in Fig. 17. The links A, the fingers of which have been bent in slight inward curve, as shown in Figs. 1 to 5, can also be made in cylindrical shape, as shown in Figs. 10 and 11.

Figure 5:
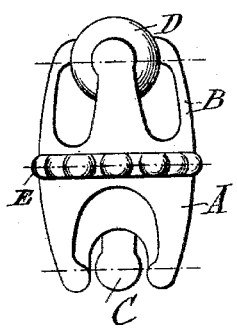

In Figs. 6, 7, 8, and 9 links are shown in which the balls do not rest in the spherical space formed by the fingers at the bottom of the link, but the balls are slightly separated therefrom and supported by the contact of the fingers themselves. For links of larger size it is advantageous to provide each link with a beaded neck E, which reduces to a considerable extent the friction of the joint formed by the links in the covering, as shown in Fig. 5.

In certain cases, as shown in Figs. 12 to 16, the balls are made integrally with one of the fingers of the links themselves. In these cases each link is provided at both ends with fingers, but a finger of one end is made integrally with the small ball sphere, as shown in Figs. 12 and 14. For connecting two links together all that is necessary is to bend around the integral ball at the end of one of the links the free fingers at the end of the next link. In this manner a flexible shaft of any desired length can be made in which connected links of a high degree of flexibility is obtained and by which motion can be transmitted with great facility.

Having thus described my invention, what I claim is—

1. A flexible shaft, composed of links provided with bent fingers at each end thereof, the fingers of one link intermeshing with the fingers of the adjacent link, and a ball inclosed between the intermeshing fingers of adjacent links, substantially as set forth.

2. A flexible shaft, consisting of a series of links provided with alternating fingers, the fingers of one link intermeshing with the fingers of the adjacent link, balls inclosed by the alternating fingers of two adjacent links, and a covering or envelop extending around all the links, substantially as set forth.

3. A flexible shaft for transmitting rotary motion consisting of a series of individual links provided with fingers at both ends, a finger at one end being provided with an integral ball about which the free fingers of the adjacent link are bent so as to embrace the same for forming a connection therewith, substantially as set forth.

4. A link for flexible shafts, composed of a solid body provided with inwardly-bent fingers at both ends, said fingers being adapted to intermesh with the fingers of an adjacent link, a ball inclosed in said bent fingers, whereby a flexible connection between the adjacent links is formed, substantially as set forth.

In testimony whereof I have signed this specification in the presence of two subscribing witnesses.

ALFRED MAROTTE.

Witnesses:
J. ALLISON BOWEN,
ANTOINE ROUSSANNES.